(12) United States Patent
Xia et al.

(10) Patent No.: US 7,103,912 B2
(45) Date of Patent: Sep. 5, 2006

(54) USER AUTHORIZATION MANAGEMENT SYSTEM USING A META-PASSWORD AND METHOD FOR SAME

(75) Inventors: Chenhong Xia, San Jose, CA (US); William Earl Malloy, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 09/896,457

(22) Filed: Jun. 29, 2001

(65) Prior Publication Data

US 2003/0005299 A1    Jan. 2, 2003

(51) Int. Cl.
  *G06F 11/00* (2006.01)
(52) U.S. Cl. .............. 726/8; 726/6; 726/7; 726/9; 726/10; 726/18; 726/19
(58) Field of Classification Search ............ 713/200, 713/202, 201, 185, 184, 183; 726/5, 4, 8, 726/7, 28–30, 6–10, 18–19
See application file for complete search history.

(56) References Cited

U.S. PATENT DOCUMENTS

| | | | | |
|---|---|---|---|---|
| 4,819,267 A | * | 4/1989 | Cargile et al. ............. | 713/184 |
| 5,319,705 A | * | 6/1994 | Halter et al. .............. | 705/54 |
| 5,341,425 A | * | 8/1994 | Wasilewski et al. ........ | 380/212 |
| 6,006,333 A | * | 12/1999 | Nielsen ................... | 713/202 |
| 6,052,785 A | * | 4/2000 | Lin et al. ................. | 726/5 |
| 6,061,789 A | * | 5/2000 | Hauser et al. ............. | 713/168 |
| 6,182,229 B1 | * | 1/2001 | Nielsen ................... | 713/202 |
| 6,240,512 B1 | * | 5/2001 | Fang et al. ............... | 713/150 |
| 6,523,027 B1 | * | 2/2003 | Underwood ............... | 707/4 |
| 6,539,479 B1 | * | 3/2003 | Wu ........................ | 713/151 |
| 6,571,336 B1 | * | 5/2003 | Smith, Jr. ................ | 713/184 |
| 6,633,878 B1 | * | 10/2003 | Underwood ............... | 707/100 |
| 6,704,873 B1 | * | 3/2004 | Underwood ............... | 713/201 |
| 6,718,535 B1 | * | 4/2004 | Underwood ............... | 717/101 |
| 6,772,332 B1 | * | 8/2004 | Boebert et al. ............ | 713/153 |
| 6,816,904 B1 | * | 11/2004 | Ludwig et al. ............ | 709/226 |
| 6,904,526 B1 | * | 6/2005 | Hongwei .................. | 713/182 |
| 2002/0122553 A1 | * | 9/2002 | Kao et al. ................ | 380/28 |

OTHER PUBLICATIONS

Vesna Hassler, Security Fundamentals for E-Commerce, 2001, Artech House, Inc. pp. 42-4346-47, 173-177.*

* cited by examiner

*Primary Examiner*—Norman M. Wright
(74) *Attorney, Agent, or Firm*—Fay, Sharpe, Fagan, Minnich & McKee, LLP

(57) ABSTRACT

A user authentication information management method receives a meta-password from a user. A repository (34) lists network addresses (36) and associated handles (38), each handle having an associated encoded password. An authentication response from the user is intercepted. A modified authentication response is generated by identifying a network address to which the response is directed (208), searching for the identified network address (210) in the repository (34), identifying a handle (212) corresponding to the address based on the searching (210), decoding the password associated with the handle using the meta-password as a decoding key (214), and substituting the decoded password for the meta-password in the authentication response (216). The method also generates pseudo-random passwords (124) consistent with password rules (128). The repository (34) can reside on a client device (14), a proxy server, a local area network, or a security server having an Internet protocol (IP) address. The repository (34) can also be disposed at a database service.

39 Claims, 7 Drawing Sheets

Password Rules

Service ID: My Company

502 — ☐ Digits only
504 — ☐ Letters only
506 — ☐ Start with a letter
508 — ☑ Password is case sensitive
510 — [6] Minimum length
512 — [ ] Maximum length
514 — [ ] Minimum number of letters
516 — [1] Minimum number of digits 522 — ☑ Automically update password
520 — Password update network address:
[www.mycompany.com/PWDUPDATE.asp]
524 — Password update schedule:
[Every 2 months ▸]

USER AUTHORIZATION MANAGEMENT SYSTEM USING A META-PASSWORD AND METHOD FOR SAME

BACKGROUND OF THE INVENTION

The present invention relates to computer network security and passwords, and more particularly to the management of user authentication information. It particularly relates to the creation, storage, updating, and transmission of user identification tokens and passwords, and will be described with particular reference thereto. However, the invention is not so limited, and will also find application in other areas of secure information management such as the management and electronic transmission of credit card numbers, personal identification numbers (PIN's), and the like.

Recently, there has been a rapid rise in the number and type of secure computer services offered through the Internet or over local area networks (LAN's), wireless communication systems, internal corporate computing resources, and the like. Web browser programs originally designed for navigating an open Internet are now typically additionally used to access secure websites, secure LAN's, and other restricted sites as well. The use of a web browser simplifies the access and navigation of the various secure computer services by providing a common user interface.

In order to establish and confirm authorization to access a secure service, a user is typically required to supply at least a user identification (user ID) token and a password to establish a secure connection to the service. Loss or theft of the authorization information, especially the password, is a potential serious security risk. For this reason, each user is strongly encouraged to follow certain guidelines in creating, storing, and transmitting user ID tokens and passwords.

First, it is strongly recommended or required that each user implement a different password for each service accessed. However, users often have difficulty remembering and keeping track of a large number of passwords for the various secure services typically accessed. As a result, many users ignore the rule of a different password for each service and instead use the same password for many different secure services. Alternatively, users often maintain a physical, e.g. handwritten or printed, list of passwords, or store the passwords in an unencrypted and insecure file, such as a spreadsheet or a word processing document. Of course, the existence of such a physical insecure list in and of itself creates a greatly increased risk of password theft.

Second, it is strongly recommended or required that each password selected is essentially a random character string and thus not easily associable with the user. The use of a spouse's name or birthday, a favorite color, or other password which might be easily guessed by hackers is strongly discouraged. This rule also is commonly ignored by users who prefer to use easily remembered, but correspondingly obvious, passwords.

Third, passwords should be fairly complex. Short and simple passwords, such as "12345", "abcde", "hello", and the like, are more easily guessed than longer passwords which contain both letters and digits. Once again, however, users typically prefer the simpler passwords. This tendency can be countered to some degree by having password format rules encoded into the security management system of the secure service. Typical password format rules include a minimum password length, a requirement for at least one numerical digit, a requirement for at least one alphabetical letter, or the like. Of course, such requirements again tend to induce users to create physical lists so that the forgotten passwords can be easily recalled.

Fourth, security experts recommend changing passwords frequently. By employing frequent password changes, the risks associated with a compromised password are limited to a short time period between password changes. Users are often resistant to frequent password changes, however, because they do not want to memorize the new passwords. Many secure services counter this resistance by requiring a password change at fixed intervals, e.g. on a monthly or yearly basis.

To summarize, an inherent tension exists between the characteristics of a secure user password portfolio which include a large number of different and essentially random passwords that are frequently changed, and the desire of computer users to have only a few, or ideally just one, password which is easily memorized and can be implemented over a long period of time. The majority of methods disclosed in the prior art for alleviating this conflict weigh heavily against ease of use. In the most extreme examples, some secure services now assign a random password and enforce password changes on a weekly or monthly basis. Of course, an unrecognizable computer generated password almost certainly will result in the user physically jotting the password down on a slip next to the computer. Thus, these enforced methods are not satisfactory, at least in isolation.

The prior art also discloses methods for helping computer users to cope with large numbers of complex passwords. U.S. Pat. Nos. 6,006,333 and No. 6,182,229, both issued to Nielsen, disclose a client-side system for encoding, storing, and transmitting passwords based upon a master password. In this manner, the user need only remember the master password. The client-side system then recalls, decodes, and sends the actual password to each secure service requesting user authentication information.

There remains an unfulfilled need, however, for an improved comprehensive password management system which maintains high security while reducing the need for the user to remember a large number of frequently changing passwords. In view of the increasing availability of a variety of different types of devices (e.g., desktop computers, laptop computers, cellular telephones, personal data assistants, and the like) capable of accessing secure network services, the improved password management system should be device independent. Many secure service providers now have multiple login network addresses, and the user can supply the same authorization information at any of these addresses and thereby establish an authorized connection to the entire service. As a consequence, the password management system should preferably accommodate multiple login network addresses for the same secure service.

The increasingly rigorous password requirements imposed by secure service providers, which presently include complex password format rules and mandatory password changes on fixed time schedules, should also preferably be accommodated.

An improved password management system should also preferably be compatible with, and transparent to, legacy secure services, while simultaneously taking advantage of newer and better standardized network security protocols which are being developed and which are in some cases already available.

The present invention contemplates an improved system and method for the management of user authentication information which provides a solution to the above problems and others.

SUMMARY OF THE INVENTION

In accordance with one aspect of the present invention, a method is disclosed for management of user authentication information. A meta-password is established for an associated user. A repository is maintained which includes a list of network addresses and associated handles, each handle having an associated encoded password. A user authentication response sent by an associated user is intercepted. A network address is identified to which the authentication response is directed. A modified authentication response is generated based upon the authentication response and based upon the contents of the repository. The modified authentication response is transmitted to the identified network address via the network.

Preferably, the step of generating a modified authentication response further includes the steps of: searching for the identified network address in the repository; identifying a handle corresponding to the network address based on the searching; decoding the encoded password associated with the identified handle using the meta-password as a decoding key; and generating the modified authentication response by substituting the decoded password for the meta-password in the authentication response.

The step of generating a modified authentication response can also preferably include the steps of: receiving a handle selection from the associated user, said handle selection being selected from the handles contained in the repository; entering the network address into the repository; associating the network address with the received handle selection in the repository; decoding the encoded password associated with the received handle using the meta-password as a decoding key; and generating the modified authentication response by combining the decoded password with the authentication response.

Preferably, the method allows for a new handle to be received from the associated user using a handle management dialog box. A collection of password format rules is established. A password is generated consistent with the established password format rules. The generated password is encoded using the meta-password as an encoding key. The network address is stored in the repository. In the repository, the network address is associated with the new handle. Also in the repository, the encoded password is associated with the new handle. The step of generating a password selectively includes generating a password using a random character generator, wherein the random character generator receives as randomizing elements the meta-password and a system clock value.

Preferably, the method includes the steps of: establishing a collection of password format rules for a first handle in the repository; generating a password based upon the collection of password format rules; updating the user password on a secure service provider with which the first handle is associated to correspond with the generated password; encoding the generated password using the meta-password as an encoding key; and associating, in the repository, the encoded password with the first handle. Additional steps selectively include: receiving an update period for the first handle from the associated user; relating the update period with the first handle; and repeating, coincident with a recurrence of the update period, the generating, updating, encoding, and associating steps.

In accordance with another aspect of the present invention, a system for managing user authentication information is disclosed. The system operates in conjunction with an associated interfacing program which interfaces an associated user with a plurality of associated secure services. The system includes a repository containing at least an address table wherein each address has an associated handle and each handle has an associated encoded password. A software hook is provided, by which an authentication response sent by the interfacing program is intercepted. A processor is provided, for processing the intercepted authentication response by combining a password extracted from the repository with the intercepted authentication response.

In the preferred system, the repository resides on an associated client device, an associated proxy server, an associated local area network, or an associated security server having an Internet protocol (IP) address. The repository can also be disposed at an associated database service as desired.

One advantage of the present invention is that only a single user ID token and meta-password provides access to a plurality of networked secure services.

Another advantage of the present invention is that, in spite of the user remembering only a single user ID and meta-password for a plurality of services, a different user ID and password is nonetheless transmitted to each network service. This reduces the security impact of password interception and theft during network transit.

Another advantage of the present invention is that the user names and passwords are stored in an encrypted form. The user need not see or know the actual user names and passwords, and cannot write them down or otherwise disseminate them.

Another advantage of the present invention is that it is device independent and is compatible with access through desktop computers, laptop computers, cellular telephones, personal data assistants (PDA's), and the like.

Another advantage of the present invention is that it is compatible with existing secure services, while simultaneously taking advantage of new and improved network security protocols where available.

Yet another advantage of the present invention is that it accommodates establishment of a secure connection to a secure service provider through any of a plurality of different network addresses associated therewith.

Still yet another advantage of the present invention is that randomized passwords are automatically generated, thereby avoiding the use of passwords that are connected with the user, such as birth dates, children's names, and the like. These randomized passwords are not displayed to the user and are electronically stored in an encrypted format to further minimize the possibility of password theft.

Still further advantages and benefits of the present invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for the purposes of illustrating preferred embodiments and are not to be construed as limiting the invention.

FIG. 6 shows the preferred password rules dialog box in accordance with the invention.

DETAILED DESCRIPTION OF THE PREFERRED EMBODIMENTS

Figure 1:
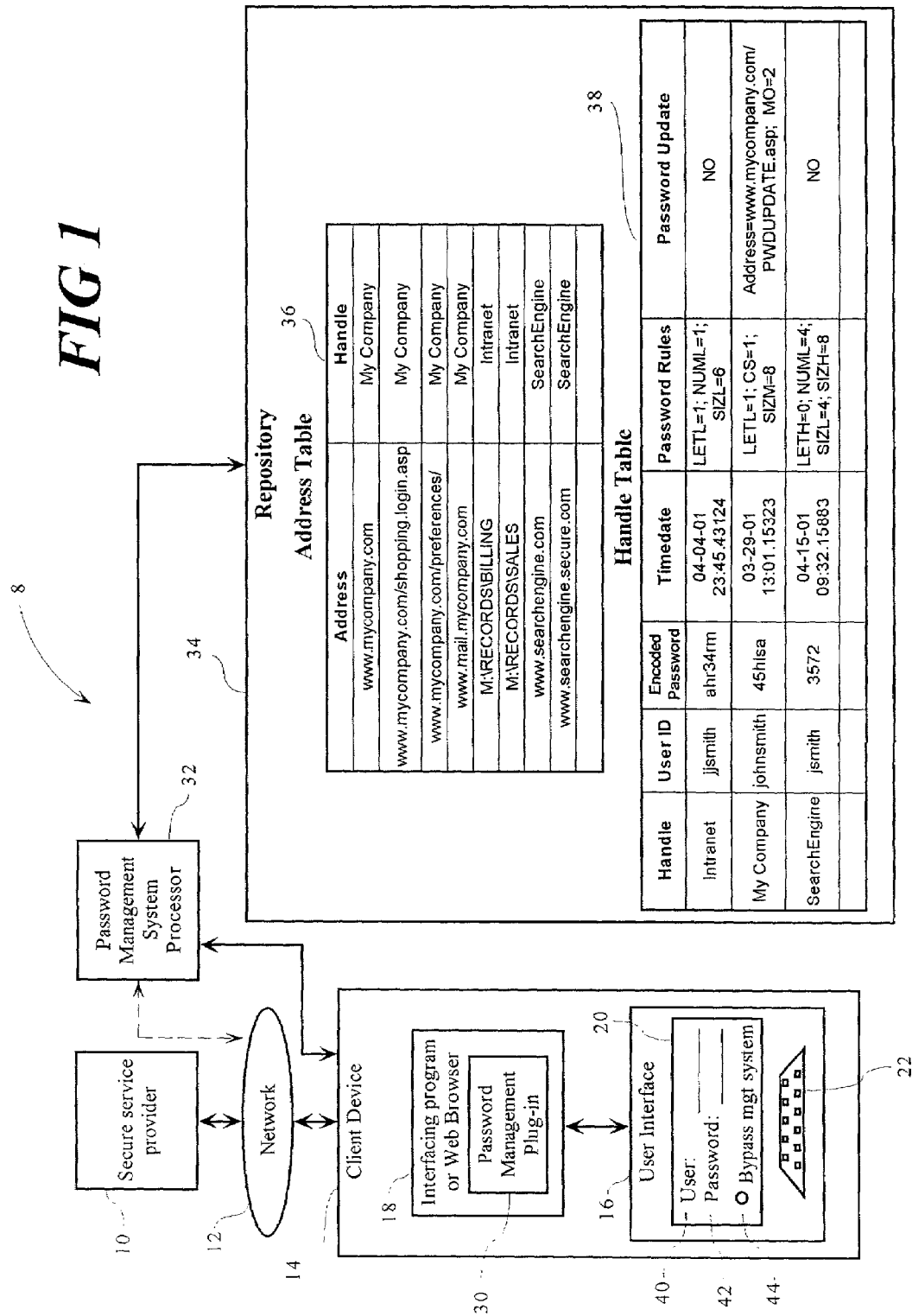
FIG. 1 is a diagram of the user authorization system according to a preferred embodiment of the invention.

With reference first to FIG. 1, the structure of the preferred embodiment of the user authentication management system 8 in accordance with the present invention is disclosed. The exemplary system 8 manages a plurality of user ID tokens and passwords, and will be described with respect to such an application. However, it will be appreciated that the invention is applicable to the management of other information including secure information such as credit card numbers, personal identification numbers PIN's), and the like.

The user authentication management system 8 operates in conjunction with an associated secure service provider 10, a network 12, and an associated client device 14 which includes a user interface 16, and which runs an appropriate interfacing program 18. The network 12 preferably interconnects the Internet, a local area network (LAN), a wireless communication system, and the like, and interconnects at least the secure service provider 10 with the client device 14. The client device 14 is preferably a desktop computer, laptop computer, network computer, or the like. However, other embodiments of the client device are also contemplated, including Internet-capable cellular telephones, personal data assistants (PDA's), and the like. The user interface 16 type or form is based upon the type or form of the client device 14, but the user interface 16 typically includes a display screen 20 and an input device 22 such as a keyboard, joystick, keypad, and the like. Preferably, the interfacing program 18 is a web browser. However, other embodiments of the interfacing program 18 are also contemplated, such as a software component of the client device 14 operating system, software that is remotely accessed across the network 12, or the like.

The authentication management system 8 includes at least a software hook 30, a processor 32, and repository 34. The software hook 30 is functional to detect and intercept authentication responses and provide for other user interactions with the authentication management system which will be described in more detail below. Preferably, the software hook 30 is a browser plug-in program which interacts with the interfacing program or web browser 18. However, other embodiments are also contemplated for the software hook 30, such as a program running or executing on a proxy server, a software component of the client device 14 operating system, and the like. The password management system processor 32 implements algorithms which create, identify, encode, decode, and update the passwords. The repository 34 stores information which relates particular secure network addresses with encoded passwords. It is to be appreciated that the processor 32 and repository 34 components can reside on the client device 14. However, these components 32, 34 are not required to reside thereat, but instead can be located on a local area network (LAN), on a proxy server, at a security server having an Internet protocol (IP) address, or the like. It is also to be understood that these components can be implemented as a repository database service accessed over the network. The option to remotely locate the repository 34 and the processor 32 is represented in FIG. 1 by the dashed connection between the processor 34 and the network 12. Placing at least the repository 34 at a location accessible over the network 12 advantageously enables the user to utilize the authentication management system 8 from any of a variety of different client devices 14, such as the user's desktop computer, a portable computer, an Internet-capable cellular telephone, and the like.

With continuing reference to FIG. 1, the repository 34 includes links between network addresses and encoded passwords. For maximum flexibility, in the preferred embodiment an intermediate value called a "handle" is defined. Each handle has a single associated encoded password. However, multiple network addresses can be associated with each handle. In the embodiment illustrated in FIG. 1, the repository 34 includes an address table 36 and a handle table 38. An exemplary handle is the "My Company" handle which has four different addresses associated therewith as shown in the address table 36. However, the "My Company" handle has only a single encoded password "45hlsa" associated therewith as shown in the handle table 38.

The use of handles provides several operational benefits. Multiple network addresses for accessing a single secure service 10 are accommodated by assigning all the addresses to a single handle corresponding to the secure service 10. In the exemplary case of the "My Company" service (or handle), network addresses corresponding to the homepage (www.mycompany.com), shopping (www.mycompany.com/shopping.login.asp), mail (www.mail.mycompany.com), and preferences (www.mycompany.com/preferences/) areas of the service are included in the address table 36. Access through any of these four network addresses is accommodated by the address table 36. If the password for the "My Company" service is changed, only the encoded password corresponding to the "My Company" handle is updated. This improves upon many prior art methods which require updating the password for every network address associated with a service individually. Adding a new network address for a service is also simplified and involves adding the new network address to the address table 36 with the appropriate handle association.

With continuing reference to FIG. 1, and with further reference to FIGS. 2 and 3, the preferred method for maintaining and using the authentication management system 8 of FIG. 1 will now be described. As shown in FIG. 1, a user is typically presented with a user authentication dialog box on the display 20 which typically requires a response that includes a user identification (user ID) token 40, and a password 42. The authentication request display can be a custom dialog box generated in HTML or another format by the secure service provider 10. The authentication request display can also be generated by the web browser 18 in response to a standardized, e.g. HTTP protocol, user login request sent by the service provider 10. In the case of a standard HTTP protocol login, the software hook or plug-in 30 preferably inserts an additional dialog input 44, such as a checkbox, radio button, or the like, that allows the user to selectively bypass applying the authentication management system 8. In the event that the selection input 44 is selected, the password management system 8 is de-activated for that login operation and the user enters the user ID and password directly.

Figure 2:
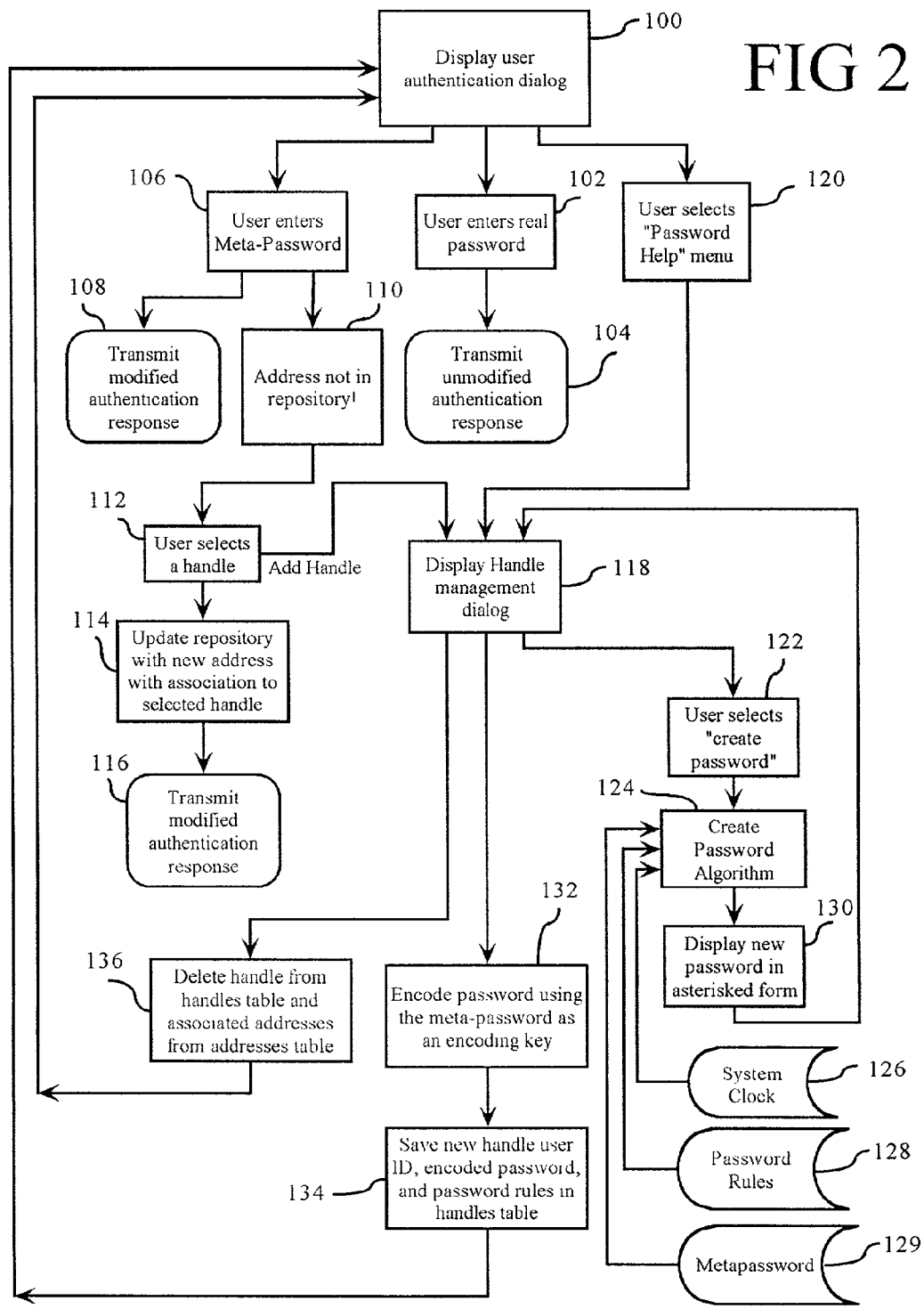
FIG. 2 is a diagrammatic representation of the preferred user authorization method in accordance with the invention.

With reference particularly now to FIG. 2, in response to a user authentication request dialog display 100, the method accepts a user's response in at least three ways. First, the user can enter the appropriate password directly in a step 102, thereby essentially bypassing the authentication management system 8. In this case, the entered information, e.g. user ID token and password, are transmitted in unmodified form 104 across the network 12 to the secure service provider 10 in the usual manner. Preferably, measures are taken to ensure that the meta-password, or a slightly mistyped version thereof, is not accidentally transmitted. In the case of an HTTP protocol login, the selection input 44 is advantageously used to direct the user to positively indicate that the appropriate password was entered directly. Another preferred check is to verify that both the entered password and the entered user ID are different from the corresponding meta-password and a master user ID. In this way, a mistyping of both inputs is required to inadvertently transmit the mistyped meta-password.

Second, the user can enter the meta-password corresponding to the user in a step 106. The meta-password is a universal or master password for the user within the scope of the user authentication system 8. The meta-password is preferably assigned to the user by the information technology organization which maintains the user authentication system 8 following the usual organizational security precautions for such password establishment. It will be appreciated that, for security reasons, the meta-password is preferably not stored in the repository 34. Preferably, the meta-password is stored only at a single centralized secure location (not shown) on the network from which the software hook 30 can obtain the meta-password, preferably through an initial log-in process involving user entry of the meta-password. In an alternate embodiment, the hook 30 can send the user-entered meta-password to a secure network site which returns an indication of the validity of the meta-password. Alternatively, the meta-password can be stored integrally with the software hook 30, in which case however user access is limited to only those devices which have the meta-password loaded. The meta-password can also be stored in encoded form with the repository 34, although in this case overall security of the repository 34 will depend on the quality of the meta-password encoding scheme. In yet another contemplated embodiment, the system 8 requires the user to enter the meta-password each time it is needed (e.g., for encoding or decoding a password, or for updating the repository 34), without the need for a subsequent verification step. The verification of the meta-password in this embodiment is inherent in the success or failure of the decoding of encoded passwords stored in the repository 34. Other means for establishing the meta-password are also contemplated and fall within the scope of the invention.

The user authentication system 8 preferably supports multiple users. Each user has an associated personal repository such as the repository 34 shown in FIG. 1. The repository 36 can be associated with the appropriate user via the meta-password. Alternatively, each user can additionally be assigned a master user ID token through which a user is associated with a personal repository 34.

Conditional upon the software hook or browser plug-in 30 detecting the meta-password in the user authentication response, the hook 30 intercepts and forwards the authentication response to the authentication management system processor 32. Alternatively, the software hook 30 can compare every transmitted user authentication response against the address table 36 to identify and intercept authentication responses directed toward addresses which are included in the repository 34. However the identification is made, the processor 32 responds by substituting an appropriate password from the repository 34 in a step 108, conditional upon the network address being located in the address table 36. Preferably, a corresponding user ID token is also substituted for the user ID token entered by the user in the user authentication response.

Figure 3:
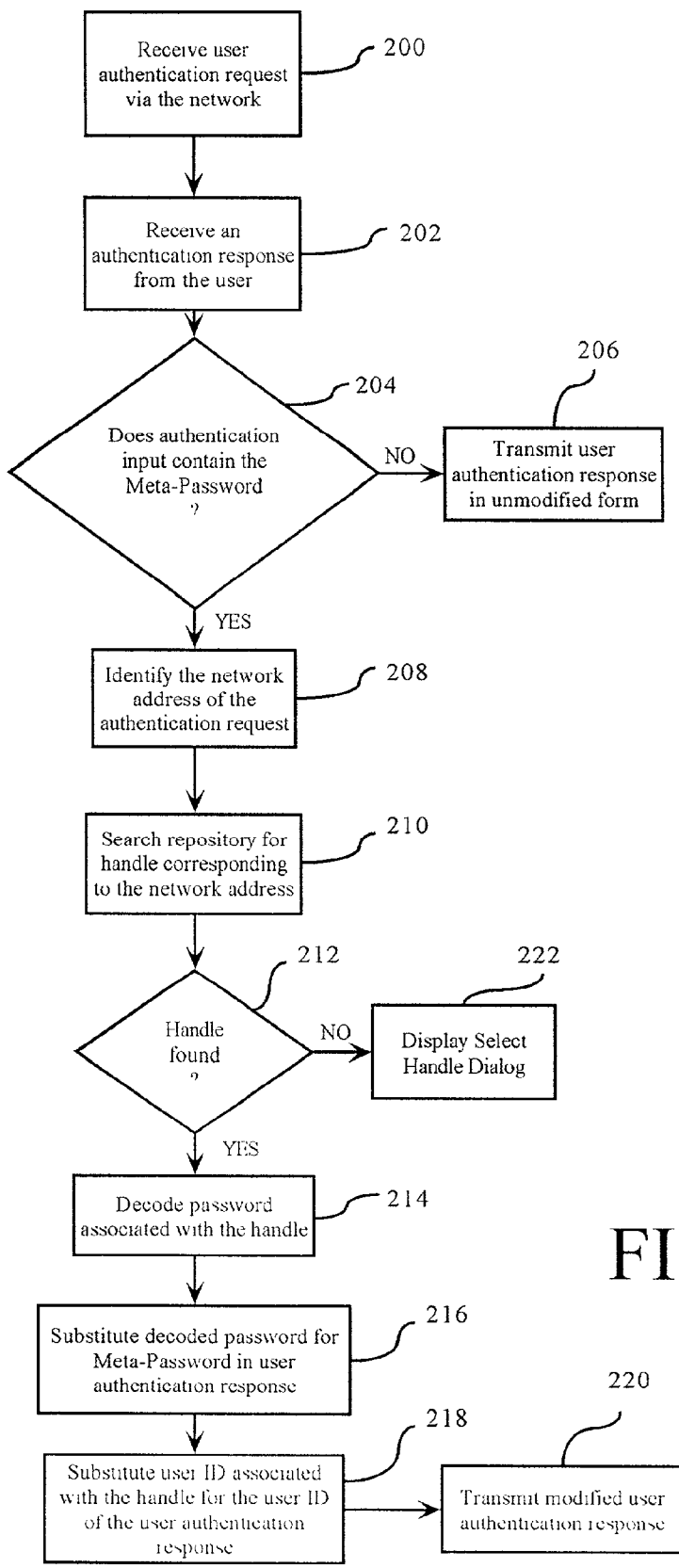
FIG. 3 is a flow chart of the preferred process for substituting an actual password for the meta-password entered by the associated user in accordance with the invention.

With continuing reference to FIG. 1 and with further reference now to FIG. 3, the preferred method for responding to a user authentication response containing the associated user's meta-password is described in greater detail. Upon receipt by the interfacing program 18 of a user authentication request 200 from a secure service provider 10 via the network 12, the interfacing program 18 responds in the usual way, and receives an authentication response from the user in a step 202. The software hook 30 intercepts and examines the response in a decision step 204. If the user's meta-password is not identified, then the software hook 30 returns to a monitoring mode, and the client device 14 transmits the user authentication response in unmodified form in a step 206. As mentioned previously, in the case of an HTTP protocol login, the selection input 44 advantageously also should be set by the user to positively indicate that the appropriate password was entered directly and should be transmitted in unmodified form. In the case of a non-standard login protocol, additional verifications are preferably performed to avoid inadvertently transmitting the meta-password directly, such as additionally checking the input user ID against the master user ID to ensure that they are different. In this way, a mistyping of both inputs is required to inadvertently transmit the mistyped meta-password. In yet another embodiment, the password management plug-in 30 displays a confirmation box through which the user must confirm direct transmission of the input password before said transmission actually takes place.

If the software hook 30 identifies the meta-password in the user authentication response, the software hook 30 identifies the network address to which the response is to be sent in a step 208 and forwards the network address information to the processor 32. The processor 32 searches the address table 36 of the repository 34 in a step 210, and extracts the corresponding handle if the address is located.

A decision step 212 controls operational flow based upon whether a corresponding handle is located in the step 210. If a handle is found, the encoded password is obtained from the handle table 38. This password is preferably encoded for security purposes as will be discussed in greater detail below. The encoded password is decoded in a step 214 to obtain the password under which the user is registered with the service provider 10. Preferably, a user ID token is also extracted from the handle table 38. The user ID token is not encoded in the handle table 38 of FIG. 1. However, the user ID token can optionally also be encoded to provide additional security.

The decoded password is substituted for the meta-password in the user authentication response in a step 216, and preferably the extracted user ID token is substituted for the entered user ID in the response in a step 218. The substituting steps 216, 218 preferably identify the appropriate substitutions in the user authentication response because the response is in a standardized, e.g. HTTP protocol, user authentication response format. The appropriate substitutions also can be identified by searching the response for certain keywords, such as "USER ID". Alternatively, or in the case of a non-standard authentication form where the automated searching fails to locate the appropriate substitutions, a dialog box (not shown) can be displayed on the display 20. The dialog box preferably shows the extracted user ID token and the decoded password, where each character of the decoded password is displayed as an asterisk ("password1" displays as "*********", for example). Such asterisk display is well known to those of ordinary skill in the art, and is commonly used for password display. Of course, other substitute characters can be used instead of asterisks. The user then transfers the user ID and password information displayed in the dialog box into the user authentication form in the usual manner, e.g. by cut-and-paste operations. After the substituting, the modified response is transmitted in a step 220 in the usual manner, e.g. by the web browser 18 via the network 12.

With reference again to FIG. 3, if at the decision step 212 it is recognized that the handle was not found, i.e. the network address is not in the address table 36, the method preferably displays an appropriate dialog box which allows the user to select a handle in a step 222. Equivalently, with reference back to FIG. 2, upon recognition that the address is not in the repository in a step 110, a handle select dialog is displayed in a step 112.

Figure 4:
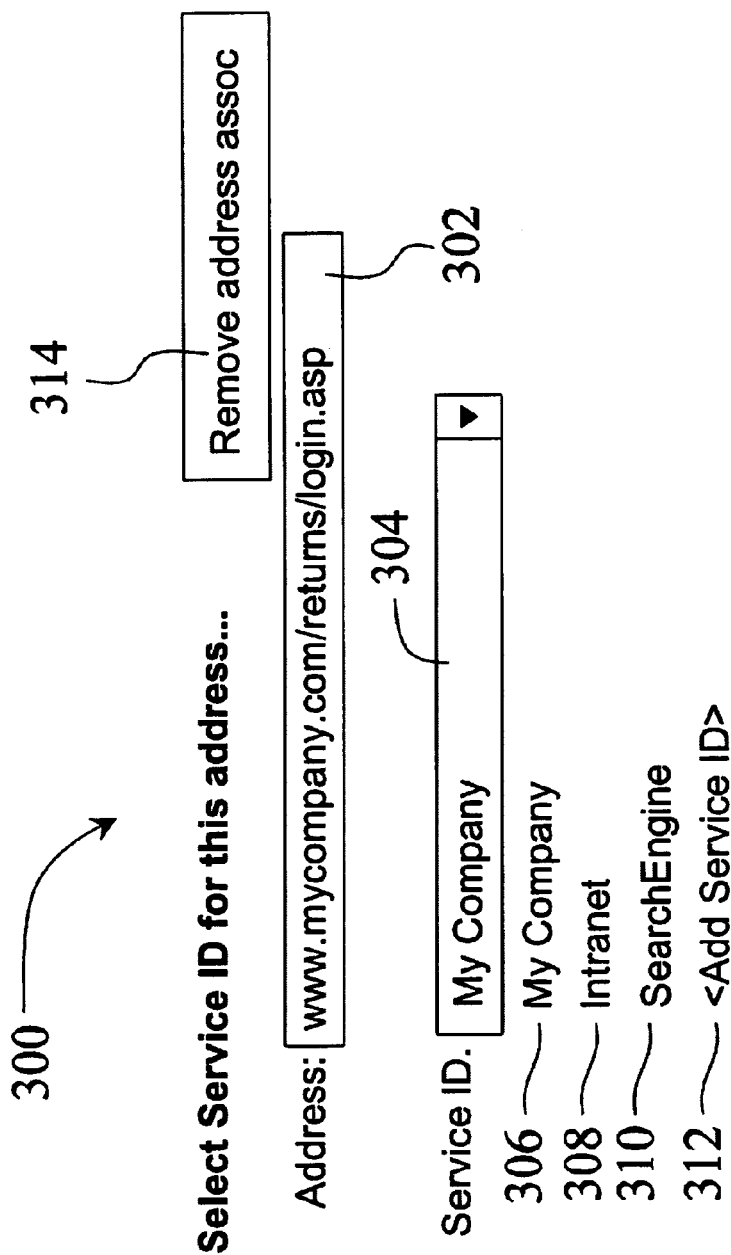
FIG. 4 shows the preferred handle selection dialog box in accordance with the invention.

With reference now to FIG. 4 and with continued reference to FIGS. 1 and 2, the select a handle step 112 preferably generates a handle selection dialog box 300. In the handle selection dialog box 300 the term "Service ID" is preferably substituted for "handle" as being more intuitive for the user. The handle selection dialog box 300 provides the user with a convenient interface for associating the network address, for which no entry exists in the address table 36, with an appropriate handle. In an address line 302 of the handle selection dialog box 300, the unassigned network address, e.g., "www.mycompany.com/returns/login.asp", is displayed. The address to 302 which the authentication response is to be sent is preferably completed on line automatically, i.e. the user does not need to enter this information, when the handle selection dialog box 300 is accessed in the step 112 of FIG. 2. Using any convenient user input dialog, e.g. a drop down list 304, the user is prompted to associate the new, unlisted address with an existing handle. The existing handles "My Company" 306, "Intranet" 308, and "SearchEngine" 310 are included in the list 304 and thus are available for selection. It is to be appreciated that the handle list 304 is generated from the handle table 38 of the repository 34.

Conditional upon the user selecting an existing handle, e.g. the "My Company" handle, the processor 32 updates the address table 36 to include the new address and the "My Company" handle association in a step 114. Preferably, the processor 32 then proceeds to modify and transmit an authorization response in a step 116 essentially according to the steps 214 and following as illustrated in FIG. 3. Since the address table was updated at step 114 of FIG. 2, any future user authorization response which is directed to this network address will have the password and user ID token modifications performed automatically according to the full process flow illustrated in FIG. 3.

Of course, at the step 112 of FIG. 2 where the user is prompted to identify an appropriate handle, it may be the case that the network address corresponds to a new secure service provider 10 for which no appropriate handle yet exists in the handle table 38. It will be recognized that the handle selection list 304 of FIG. 4 includes an entry "<Add Service ID>" 312 to accommodate this situation.

Selection of the "<Add Service ID>" option 312 causes a handle management dialog box to be displayed in a step 118 as shown in FIG. 2. The handle management dialog prefer- ably can also be accessed directly by the user in a step 120 prior to submitting the user authentication response, i.e. prior to steps 102 or 106. Such requesting step 120 advantageously is through a drop-down menu option (not shown) integrated into the menu system of the associated web browser 18. It will be appreciated that such a drop-down menu option advantageously is accessible at any time the browser 18 is active, independent of whether or not a user authentication dialog is present. Similarly, the handle selection dialog box 300 of FIG. 4 is advantageously accessible from the drop down menu so that additional network addresses can be associated with a handle without first contacting the network address. The handle selection dialog box 300 preferably also includes a "Remove Address Association" button 314 so that the user can remove outdated address associations from the Addresses Table 36 by accessing the handle selection dialog box 300 through the drop-down menu of the associated web browser 18.

Figure 5:
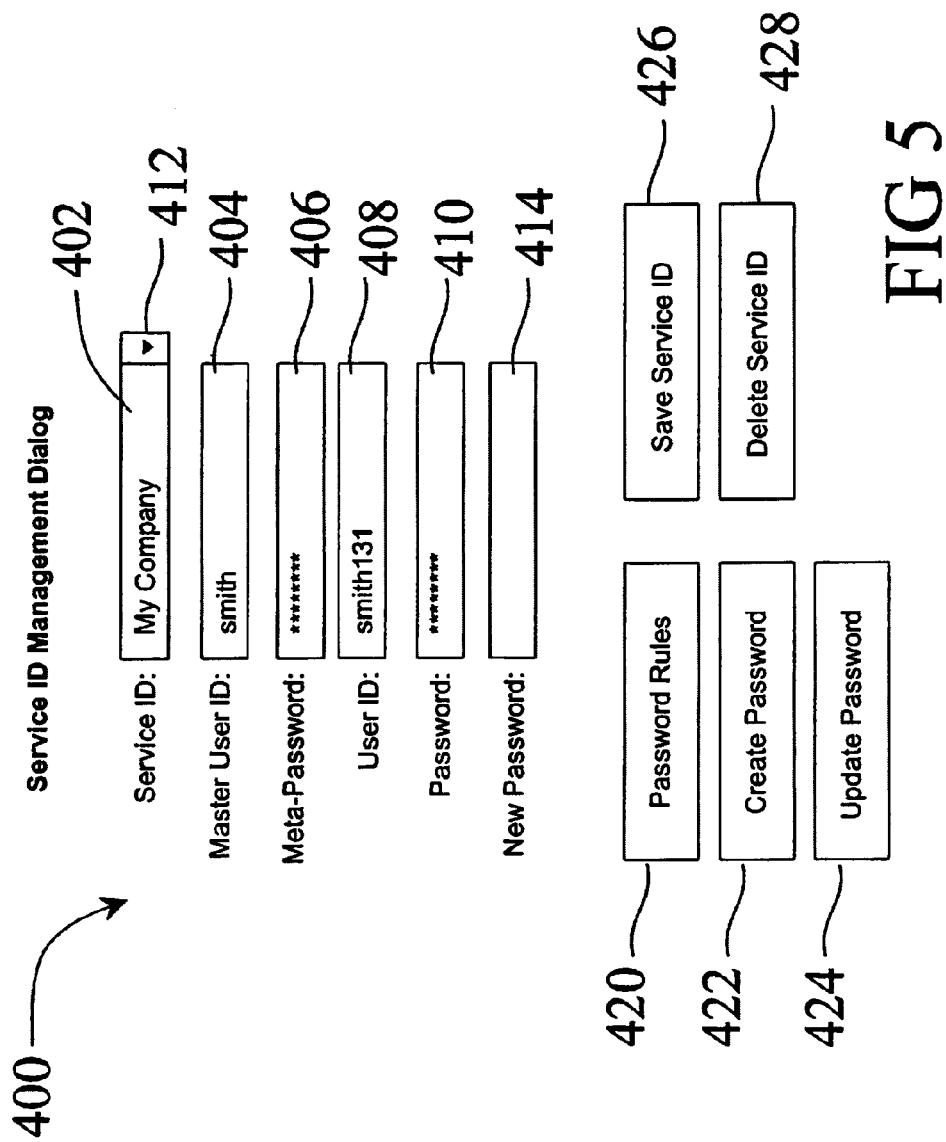
FIG. 5 shows the preferred handle management dialog box in accordance with the invention.

With continuing reference to FIGS. 1 and 2, and with further reference now to FIG. 5, a preferred handle management dialog box 400 is described. Once again, the handle management dialog box 400 preferably uses the more user-friendly term "service ID" in substitution for "handle". The handle management dialog box 400 allows the user to directly manage the handles of the repository 34. User operations achievable through the handle management dialog box 400 preferably include adding new handles, removing existing and outdated handles, and updating password and user ID token information.

The handle management dialog box 400 displays information including the handle 402 (labeled as "Service ID"), the master user ID token 404, the meta-password 406 (preferably displayed in asterisked format), the actual (or "raw") user ID token 408 corresponding to the handle identified in input 402, and the actual (or "raw") password 410 corresponding to the handle identified in input 402 (again, preferably displayed in asterisked format). It will be appreciated that these entries may not be completely filled-in. For example, if the handle management dialog box 400 is accessed through the menu option step 120 of FIG. 2, no handle is initially selected and so the lines for service ID 402, user ID 408, and password 410 are initially blank.

In one preferred embodiment, the user is always required to enter at least the meta-password in the line 406 for security purposes, and so this line is preferably initially blank every time the handle management dialog box 400 is displayed. The master user ID 404 is preferably used to associate a particular repository 34 with a particular user, so that the authentication management system 8 can be used by multiple users, either simultaneously or in succession. This embodiment permits multiple users to use the same user interface 16 in a secure manner wherein each user must supply his or her master user ID and meta-password every time a secure transaction involving the user authentication system 8 is performed.

In another preferred embodiment, the user is already logged into the user authentication system 8 and the user interface 16 is itself considered secure. In this embodiment, there is no need for the user to supply the master user ID and meta-password in the handle management dialog box 400 and so the user dialog inputs 404, 406 are optionally removed from the dialog box 400.

With continuing reference to FIGS. 1, 2, and 5, the handle management dialog box 400 is used for updating an existing handle or for adding a new handle. The user preferably selects the existing handle using the drop-down list arrow 412 of the service ID input 402. Upon selection and correct entry of the master user ID 404 and the meta-password 406 (if required), the user ID 408 and password 410 lines are completed with the appropriate contents retrieved from the handle table 38 of the repository 34 and decoded by the processor 32. Preferably, the password is displayed with asterisks as shown. Alternatively, a new handle can be added by typing the new handle into the service ID input 402.

Updating of the user ID is preferably performed manually, by editing the user ID field 408. Optionally, the password 410 is also be updated by editing the new password field 414, which once again is advantageously displayed in a format of asterisks. Preferably, however, the password updating is automated using the "Create Password" button 422, as will be described below.

In order to create a password, the password rules preferably are first identified. These rules provide restrictions and bounds on the allowable format (e.g., length, content, et cetera) of the password. In the illustrated embodiment, a password rules dialog box is accessed by selecting the "Password Rules" button 420 of the handle management dialog box 400 of FIG. 5.

With reference now to FIG. 6, an exemplary password rules dialog box 500 accessed by operating the "Password Rules" button 420 is illustrated. Appropriate password rules are established by the user through check box inputs, numeric inputs, and the like. In the exemplary FIG. 6, the password rules include: limiting passwords to digits 502; limiting passwords to letters 504; starting the password with a letter 506; generating a case-sensitive password (e.g., "A" is not equal to "a") 508; specifying a minimum password length 510; specifying a maximum password length 512; specifying a minimum number of letters 514; and specifying a minimum number of digits 516. Of course, this list is only exemplary, and fewer, additional or different password rules may be incorporated as desired.

With continuing reference to FIG. 6 and with further reference again to FIG. 1, upon exiting the password rules dialog box 500, the updated password rules are stored in the handles table 38, e.g. under a password rules column. The password rules are stored in any suitable format. In the exemplary handles table 38, mnemonic tokens are used: "LETL" represents the minimum (i.e., least) number of letters, "SIZM" represents the maximum password length (i.e., size), and so forth. Of course, various other password rules encoding schemes may alternatively be used.

The password creation process will now be described with reference to FIGS. 1, 2, and 5. After setting up the password rules, the create password option is selected by the user in a step 122 by operating the "Create Password" button 422. The create password algorithm is implemented by the processor 32 in a step 124. Preferably, this algorithm receives at least a system clock input 126, a password rules input 128, and the meta-password 129. The system clock input 126 is the instantaneous value of a timer or clock of the type virtually universally maintained by computing devices and available for use. In one embodiment, the least significant few digits of the clock are used as the seed value input to a pseudo-random number generator to generate a pseudo-random number sequence. A wide variety of pseudo-random number generators are known in the art and may be used equally. In that embodiment, the least significant few digits used as the seed value are not stored as part of a time stamp for later use to determine the date for automated updates of the password.

In a preferred embodiment, a combination of the meta-password with the least significant few digits of the clock is used as the seed value input to the pseudo-random random number generator to generate the pseudo-random number sequence. In this embodiment, the clock time value can be stored directly as desired for later use as the time stamp to trigger automated updates.

The password rules 128 provide bounds on the allowable format (e.g., length, content, et cetera) of the password as discussed previously with particular reference to FIG. 6. The password rules 128 are extracted from the password rules column of the handles table 38. In both embodiments described above, the password is preferably created using a character generator based on the pseudo-random number sequence generated. Such generators are well known to those of ordinary skill in the art, and need not be described here. Once generated, the password created is displayed in the new password line 414 in a step 130, preferably in asterisked format.

The actual updating of the password on the secure service provider 10 is accomplished using one of two methods, dependent upon the standardization of the secure service provider 10. In an automated method a standard, e.g. HTTP protocol, password updating method is invoked. For this method, the user provides the information necessary to update the password in the password rules dialog box 500. In the exemplary FIG. 6, this information includes a password update network address 520 which is used for updating the password. Conditional upon the secure service provider including a standard password updating protocol and conditional upon the appropriate information being stored in the handles table 38, e.g. under a password update column, the password updating is effectuated by selecting the "Update Password" button 424. Upon confirmation of successful updating of the password at the secure service provider 10 (said confirmation typically being included in the standard password updating protocol) the processor 32 preferably immediately updates the password information in the handles table 38. The stored password is preferably encoded using the meta-password as an encoding key. In this manner, theft of the repository 34 without simultaneous knowledge of the meta-password will not enable unauthorized use of the passwords, since the passwords in the repository are encoded. While the least significant digits of the system clock are used in the password generation process, the date is preferably used for automated updates to be described later. Preferably, a failure in the confirmation of the automatic password updating will result in an appropriate failure message (not shown) being displayed to the user, and no updating of the handles table 38.

Conditional upon the standard password updating being activated and functional as discussed above, the user selectively sets up an automated schedule for password updating. As shown in FIG. 6, the user selects the automatic updating via a check box 522 or other convenient indicating means, and selects the desired updating schedule using a list box 524 or other convenient selection means. After initial set up, the password updating as described above automatically occurs at the scheduled intervals using the standard, e.g. HTTP, protocol. Because the password creation is automatic and the user enters only the meta-password in response to a user authentication request, such periodic updating is completely transparent to the user. It will be appreciated that the Timedate column of the handles table 38 is advantageously used to determine the elapsed time since the last password update.

Conditional upon the secure service provider 10 not implementing a standard password updating protocol, the updating is preferably performed semimanually. For example, the user selectively cuts-and-pastes the old password stored in the password line 410 and the new password stored on line 414 into appropriate inputs of a password updating dialog box displayed by the browser 18, and transmits the response via the network 12 in the usual way. The user then operates the "Update Password" button 424 to update the password information in the handles table. Preferably, a message is displayed to the user (not shown) indicating that an automatic updating of the password at the secure service provider was not performed, so that the user is aware that a semi-manual updating will be required.

It will be recognized that in the case of automatic password updating, having separate buttons for "Create Password" 422 and for "Update Password" 424 is redundant, and the two buttons 422, 424 are advantageously replaced by a single control (not shown) that initiates both the password creation and the subsequent updating. In cases where semi-manual password updating is necessary, e.g. for non-HTTP protocol logins, the two separate inputs 422, 424 advantageously allow the user to first generate a password that is displayed in the New Password window after operating the "Create Password" button 422, followed by the actual updating of the Handles Table 38 via the "Update Password" button 424 after successful manual updating of the login information at the service provider 10.

In addition to the password management operations discussed above, the handle management dialog box 400 provides additional options for adding, updating, and deleting handles, i.e. service ID's. With continuing reference to FIGS. 1, 2, and 5, selection of the "Save Service ID" button 426 initiates an updating of the handle information. The password is encoded in a step 132, using the meta-password as an encoding key as usual. The handle information including the handle, user ID, encoded password, and password rules are stored into the handles table 38 in a step 134. In the case of a new handle, this step will create a new row in the handles table 38.

Selection of the "Delete Service ID" button 428 initiates a removal of the handle indicated in line 402 of the handle management dialog box 400. The row in the handles table 38 corresponding to the handle along with any addresses in the address table 36 linked to that handle are deleted in a step 136. Preferably, the user is prompted for confirmation before any delete operation is acted upon. Such a prompt preferably displays the addresses which will be removed, if such addresses exist.

Figure 7:
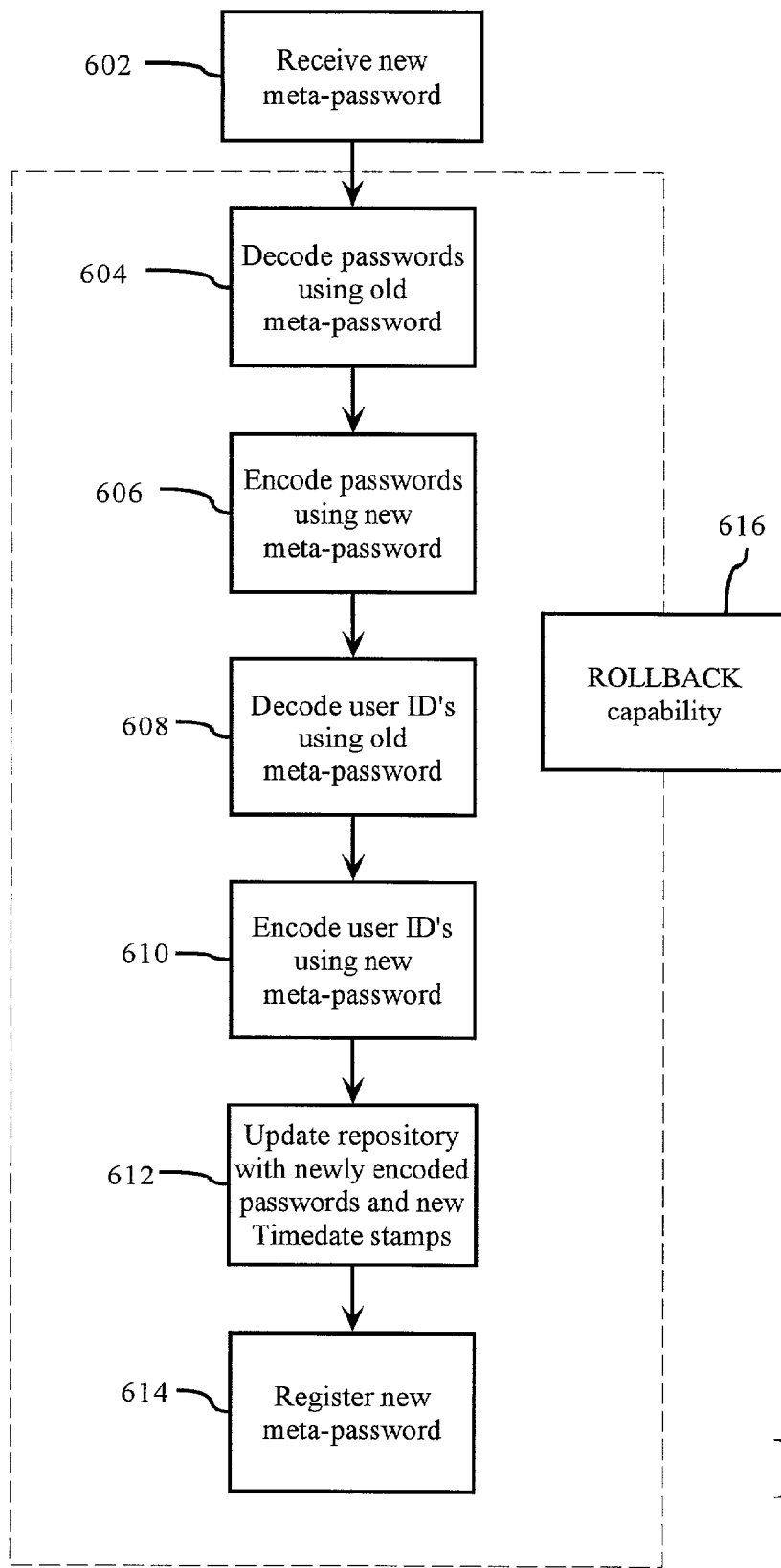
FIG. 7 shows a preferred embodiment of changing the meta-password.

With reference now to FIG. 7, a preferred embodiment for changing the meta-password is described. In a step 602 a new meta-password is received. Depending upon the configuration of the user authentication system 8, the new meta-password can be supplied by the user, or by an authorized information technology organization or person. After the new meta-password is received, the passwords in the handles table 38 are decoded using the old meta-password 604, and encoded using the new meta-password 606. In the case where encoded user ID's are also stored in the handles table 38, these are also decoded and encoded using the old and new passwords, respectively, in steps 608, 610. The repository is updated with the newly encoded information in a step 612, and the new meta-password is registered in a step 614, i.e. the new meta-password replaces the old meta-password wherever the meta-password is stored. As discussed previously, a number of possible locations for storing the meta-password are contemplated.

In the process of updating the meta-password, it is essential that the steps 604, 606, 608, 610, 612, and 614 have rollback capability 616. As described above, the repository and the meta-password can be managed separately by different management systems as desired. Without comprehensive rollback capability, the user risks losing a portion or all of the password information stored in the repository as well as losing meta-password update information wherever the meta-password is stored. Since this information is not generally known to the user, it could be irrevocably lost. In one preferred embodiment in which the repository and the meta-password is stored on a relational database, the rollback capability of the relational database can be used for the rollback step 616. Alternatively, in other repository embodiments the unmodified repository can be stored as a backup file until the updating is complete and the new meta-password is registered 614. Of course, in this case it is important to ensure that the backup file is deleted, preferably with file wiping to ensure that the deleted backup file is unrecoverable.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for management of user authentication information, comprising:
   providing a repository including a list of network addresses, each network address having an associated handle and each handle having an associated encoded password;
   receiving a user authentication response sent by an associated user to a network, the user authentication response including a meta-password;
   identifying, in said user authentication response, a first network address to which the user authentication response is directed, the first network address being associated in said repository with a first handle and with a first encoded password;
   generating a modified authentication response by decoding the first encoded password using the meta-password as a decoding key and combining the decoded password with the user authentication response; and
   transmitting the modified authentication response to the identified network address via the network.

2. The management method according to claim 1, wherein generating a modified authentication response further includes:
   searching for the identified network address in the repository;
   identifying a handle corresponding to the network address based on the searching step;
   decoding the encoded password associated with the identified handle using the first meta-password as a decoding key; and
   generating the modified authentication response by substituting the decoded password for the first meta-password in the authentication response.

3. The management method according to claim 2 further including:
   receiving a second meta-password from the associated user together with a request for meta-password update;
   using said first meta-password as a key, decoding each of said passwords associated with said list of network addresses as decoded passwords;

using said second meta-password as a key, encoding each of said decoded passwords as re-encoded passwords; and storing the re-encoded passwords in said registry.

4. The management method according to claim 3 further including registering said second meta-password in an associated storage location.

5. The management method according to claim 1, wherein generating a modified authentication response further includes:

receiving a handle selection from the associated user, said handle selection being selected from the handles contained in the repository;

entering the identified network address into the repository;

in the repository, associating the identified network address with the received handle selection;

decoding the encoded password associated with the received handle using the first meta-password as a decoding key; and generating the modified authentication response by combining the decoded password with the authentication response.

6. The management method according to claim 5, wherein receiving a handle selection from the associated user further includes:

displaying a handle selection dialog box including displaying the handles stored in the repository; and receiving a handle selection from the associated user via the selection dialog box.

7. The management method according to claim 1, further including:

searching for the identified network address in the repository;

recognizing, based upon the searching step, that the network address is not associated with a handle in the repository; and when the network address is not associated with the handle in the repository, displaying a handle selection dialog box.

8. The management method according to claim 1, further including:

accessing a handle management dialog box;

in the handle management dialog box, receiving a new handle from the associated user, said new handle not being included in the repository;

establishing a collection of password rules; generating a password consistent with the established password rules;

encoding the generated password using the first meta-password as an encoding key;

storing the network address in the repository;

in the repository, associating the network address with the new handle; and in the repository, associating the encoded password with the new handle.

9. The management method according to claim 8, wherein generating a password includes generating a password using a pseudo-random number generator.

10. The management method according to claim 9, wherein generating a password further includes:

obtaining a system time;

mathematically combining the system time and the meta-password to obtain a seed value;

applying the seed value to an operation of the pseudo-random number generator to generate a pseudo-random number sequence; and using the pseudo-random number sequence to generate a character sequence as said password.

11. The management method according to claim 9, wherein generating a password using a pseudo-random number generator further includes:

obtaining a system time;

applying the system time as a seed to an operation of the pseudo-random number generator to generate a pseudo-random number sequence; and, using the pseudo-random number sequence to generate a character sequence.

12. The management method according to claim 8, wherein establishing a collection of password rules includes receiving a collection of password rules from the associated user.

13. The management method according to claim 1, further including:

establishing a collection of password rules for a first handle in the repository;

generating a password consistent with the collection of password rules;

updating the user password to correspond with the generated password on a secure service provider with which the first handle is associated;

encoding the generated password using the first meta-password as an encoding key; and associating, in the repository, the encoded password with the first handle.

14. The management method according to claim 13, further including:

receiving an update period for the first handle from the associated user;

associating the update period with the first handle; and repeating, coincident with a recurrence of the update period, the generating, the updating, the encoding, and the associating.

15. The management method according to claim 1 wherein generating a modified authentication response further includes:

verifying that the authentication response includes the first meta-password; and conditional upon the verifying step not locating the first meta-password in the authentication response, generating a modified authentication response which includes substantially no changes relative to the authentication response.

16. A system for managing user authentication information in an associated interfacing program which interfaces an associated user with a plurality of associated secure services, the system comprising:

a repository containing an address table storing addresses wherein each address has a handle associated therewith and each handle has an encoded password associated therewith;

a software hook by which an authentication response including a meta-password sent by the interfacing program to a first address is intercepted; and a processor for processing the intercepted authentication response to form a modified authentication response by i) indexing said repository using said first address and extracting a first handle associated with the first address and a first encoded password associated with the first handle, ii) decoding the first encoded password extracted from the repository using said meta-password as a decoding key to generate a decoded first password, and iii) substituting said meta-password with said decoded first password to form said modified authentication response.

17. The system as set forth in claim 16, wherein the repository resides on one of: an associated client device, an associated proxy server, an associated local area network, and an associated security server having an Internet protocol (IP) address.

18. The system as set forth in claim 16, wherein the repository is disposed at an associated database service.

19. The system as set forth in claim 16, further comprising:
   a maintenance processor for enabling user maintenance of the address table.

20. The system as set forth in claim 16, further comprising:
   a password generator for generating a password based upon a pseudo-random quantity; and
   a password encoder for encoding a password using the meta-password as an encoding key.

21. The system as set forth in claim 20, wherein the pseudo-random quantity is constructed from the first meta-password and a system clock value.

22. The system as set forth in claim 16, wherein:
   the repository includes a handle table for associating each handle with an encoded password.

23. The system as set forth in claim 16, wherein the handle table includes a user ID associated with each handle.

24. The system as set forth in claim 16, wherein the handle table includes a collection of password rules associated with each handle.

25. An article of manufacture comprising a program storage medium readable by a computer and embodying one or more instructions executable by the computer for performing a method for management of user authentication information, comprising:
   providing a repository including a list of network addresses, each network address having an associated handle and each handle having an associated encoded password;
   receiving a user authentication response sent by an associated user to a network, the user authentication response including a meta-password;
   identifying, in said user authentication response, a first network address to which the authentication response is directed, the first network address being associated in said repository with a first handle and with a first encoded password;
   generating a modified authentication response by decoding the first encoded password using the meta-password as a decoding key and substituting the decoded password for the meta-password in the user authentication response; and
   transmitting the modified authentication response to the identified network address via the network.

26. The article of manufacture according to claim 25, wherein generating a modified authentication response further includes:
   searching for the identified network address in the repository;
   identifying a handle corresponding to the network address based on the searching step;
   decoding the encoded password associated with the identified handle using the first meta-password as a decoding key; and
   generating the modified authentication response by substituting the decoded password for the first meta-password in the authentication response.

27. The article of manufacture according to claim 26 further including:
   receiving a second meta-password from the associated user together with a request for meta-password update;
   using said first meta-password as a key, decoding each of said passwords associated with said list of network addresses as decoded passwords;
   using said second meta-password as a key, encoding each of said decoded passwords as re-encoded passwords; and
   storing the re-encoded passwords in said registry.

28. The article of manufacture according to claim 27 further including registering said second meta-password in an associated storage location.

29. The article of manufacture according to claim 25, wherein generating a modified authentication response further includes:
   receiving a handle selection from the associated user, said handle selection being selected from the handles contained in the repository;
   entering the identified network address into the repository;
   in the repository, associating the identified network address with the received handle selection;
   decoding the encoded password associated with the received handle using the first meta-password as a decoding key; and
   generating the modified authentication response by combining the decoded password with the authentication response.

30. The article of manufacture according to claim 29, wherein receiving a handle selection from the associated user further includes:
   displaying a handle selection dialog box including displaying the handles stored in the repository; and
   receiving a handle selection from the associated user via the selection dialog box.

31. The article of manufacture according to claim 25, further including:
   searching for the identified network address in the repository;
   recognizing, based upon the searching step, that the network address is not associated with a handle in the repository; and
   when the network address is not associated with the handle in the repository, displaying a handle selection dialog box.

32. The article of manufacture according to claim 25, further including:
   accessing a handle management dialog box;
   in the handle management dialog box, receiving a new handle from the associated user, said new handle not being included in the repository;
   establishing a collection of password rules;
   generating a password consistent with the established password rules;
   encoding the generated password using the first meta-password as an encoding key;
   storing the network address in the repository;
   in the repository, associating the network address with the new handle; and
   in the repository, associating the encoded password with the new handle.

33. The article of manufacture according to claim 32, wherein generating a password includes generating a password using a pseudo-random number generator.

34. The article of manufacture according to claim 33, wherein generating a password further includes:
obtaining a system time;
mathematically combining the system time and the meta-password to obtain a seed value;
applying the seed value to an operation of the pseudo-random number generator to generate a pseudo-random number sequence; and
using the pseudo-random number sequence to generate a character sequence as said password.

35. The article of manufacture according to claim 33, wherein generating a password using a pseudo-random number generator further includes:
obtaining a system time;
applying the system time as a seed to an operation of the pseudo-random number generator to generate a pseudo-random number sequence; and,
using the pseudo-random number sequence to generate a character sequence.

36. The article of manufacture according to claim 32, wherein establishing a collection of password rules includes receiving a collection of password rules from the associated user.

37. The article of manufacture according to claim 25, further including:
establishing a collection of password rules for a first handle in the repository;
generating a password consistent with the collection of password rules;
updating the user password to correspond with the generated password on a secure service provider with which the first handle is associated;
encoding the generated password using the first meta-password as an encoding key; and
associating, in the repository, the encoded password with the first handle.

38. The article of manufacture according to claim 37, further including:
receiving an update period for the first handle from the associated user;
associating the update period with the first handle; and
repeating, coincident with a recurrence of the update period, the generating, the updating, the encoding, and the associating.

39. The article of manufacture according to claim 25 wherein generating a modified authentication response further includes:
verifying that the authentication response includes the first meta-password; and
conditional upon the verifying step not locating the first meta-password in the authentication response, generating a modified authentication response which includes substantially no changes relative to the authentication response.

* * * * *